(12) United States Patent
Sonnekalb

(10) Patent No.: US 8,612,777 B2
(45) Date of Patent: Dec. 17, 2013

(54) APPARATUS AND METHOD FOR WRITING DATA TO BE STORED TO A PREDETERMINED MEMORY AREA

(75) Inventor: Steffen Marc Sonnekalb, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 1136 days.

(21) Appl. No.: 12/351,151

(22) Filed: Jan. 9, 2009

(65) Prior Publication Data

US 2010/0180181 A1  Jul. 15, 2010

(51) Int. Cl.
*G06F 21/00* (2013.01)

(52) U.S. Cl.
USPC ........... 713/194; 714/100; 714/701; 714/703; 714/758; 714/768

(58) Field of Classification Search
USPC ....................................................... 713/194
See application file for complete search history.

(56) References Cited

U.S. PATENT DOCUMENTS

| 5,805,799 | A * | 9/1998 | Fredrickson et al. | 714/52 |
|---|---|---|---|---|
| 6,308,256 | B1 * | 10/2001 | Folmsbee | 712/209 |
| 2002/0029346 | A1 * | 3/2002 | Pezeshki et al. | 713/190 |
| 2002/0112197 | A1 * | 8/2002 | Yoshino et al. | 714/6 |
| 2002/0124179 | A1 * | 9/2002 | Kaminaga et al. | 713/194 |
| 2003/0012372 | A1 * | 1/2003 | Cheng | 380/28 |
| 2003/0093684 | A1 * | 5/2003 | Kaiserswerth et al. | 713/193 |
| 2003/0126451 | A1 * | 7/2003 | Gorobets | 713/189 |
| 2006/0015754 | A1 * | 1/2006 | Drehmel et al. | 713/193 |
| 2006/0179395 | A1 * | 8/2006 | Sonnekalb | 714/758 |
| 2007/0033417 | A1 * | 2/2007 | Gammel et al. | 713/189 |
| 2007/0033467 | A1 * | 2/2007 | Bancel et al. | 714/732 |

OTHER PUBLICATIONS

Chen et al., Defeating Memory Corruption Attacks via Pointer Taintedness Detection, Jun. 2005, Proceedings of the 2005 International Conference on Dependable Systems and Networks, pp. 378-387.*

* cited by examiner

*Primary Examiner* — Taghi Arani
*Assistant Examiner* — Kenneth Chang
(74) *Attorney, Agent, or Firm* — Schiff Hardin LLP

(57) ABSTRACT

Method and apparatus for writing data to be stored to a predetermined memory area, the method comprising: reading stored data from the predetermined memory area, the stored data comprising a stored data block and an associated stored error detection value, manipulating, after reading the stored data, at least one of the stored data block and the associated stored error detection value in the predetermined memory area, and writing, after manipulating, the data to be stored to the predetermined memory area.

16 Claims, 3 Drawing Sheets

US 8,612,777 B2

APPARATUS AND METHOD FOR WRITING DATA TO BE STORED TO A PREDETERMINED MEMORY AREA

BACKGROUND

Embodiments relate to an apparatus and a method for writing data to be stored to a predetermined memory area, which may, for example, be applied for detecting cryptographic attacks.

In cryptographic systems, so-called side channel attacks may be performed in order to gain cryptographic information from the crypto system. For example, fault analysis is one type of various possible side channel attack in the field of cryptography. The principle here is to induce faults into cryptographic implementations in order to reveal internal states from a processor or an associated memory.

For example, a smart card containing an embedded processor might be subjected to high temperature, unsupported supply voltage or current, excessively high over-clocking, strong electric or magnetic fields or even ionizing radiation to influence the operation of a central processing unit (CPU) or associated periphery like, for example, a main memory (e.g. a random access memory, RAM). Here, due to such an attack, write-operations for writing back data to the main memory may be corrupted such that, e.g., data is written back to wrong memory addresses.

Hence, it is desirable to provide a concept to detect such wrong memory write-operations, possibly due to malicious side-channel attacks.

BRIEF DESCRIPTION OF THE DRAWINGS

Some embodiments will be detailed subsequently referring to the accompanying drawings, in which.

DETAILED DESCRIPTION OF THE EMBODIMENTS

Figure 1:
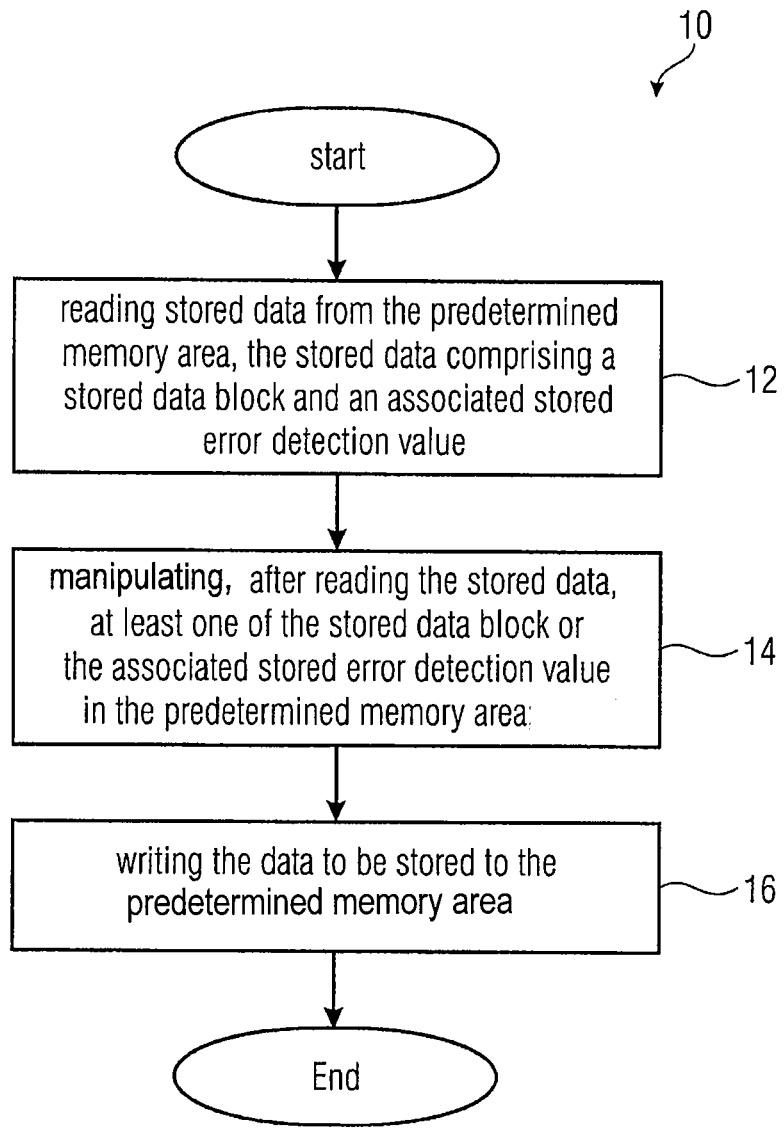
FIG. 1 is a schematic flow chart of a method for a destructive reading of data of a predetermined memory area in order to secure a write-operation according to an embodiment of the present invention.

The following description sets forth specific details, such as particular embodiments, procedures, techniques, etc. for purposes of explanation, but not limitation. It will be appreciated by one skilled in the art that other embodiments may be employed apart from these specific details. For example, although the following description is facilitated using non-limiting example applications to cache-based memory systems, the technology may be employed to any type of memory system. In some instances, detailed descriptions of well-known methods, interfaces, circuits and devices are omitted so as not to obscure the description with unnecessary details. Moreover, individual blocks are shown in some of the Figs. Those skilled in the art will appreciate that the functions of those blocks may be implemented using individual hardware circuits using software programs and data in conjunction with a suitably-programmed digital microprocessor or a general-purpose computer using application-specific integrated circuitry (ASIC) and/or using one or more digital signal processors (DSPs).

Many of today's memory technologies have the problem that individual bit errors may sporadically occur. This is unavoidable. However, the problem is generally limited to individual widely-scattered bits. Multi-bit errors in a limited data region do occur, however, they occur so sparsely that they generally do not pose a reliability problem. However, the reliability of many memory products suffers from the individual errors or one-bit errors. For this reason, data stored in memory elements is provided with redundancy information allowing these errors to be recognized and, if applicable, to be corrected.

This can be achieved by adding an error code per memory block, a memory being organized into individual memory blocks and every memory block including one or several data words (e.g. one data word=one byte). A plurality of data words stored in a memory block shall be denoted as a data block in the sequel, that is, a data block comprises a plurality of data words.

Both error-detecting codes (EDC) and error-correcting codes (ECC) may be employed as error codes. If a very small memory block is chosen as a basic unit, the code's expenditure, that is, in particular, the memory space acquired for storing an error detection or correction value associated to a data block, is very large compared to the size of the memory or data block. If, however, a greater block unit or size of the underlying memory block is chosen, the additional expenditure for the error code or the error detection value will be tolerable, however, memory access will become very slow and energy-intensive due to the requirement of reading the entire block even if only an individual byte of the block is required. For checking the correctness of a data word, e.g. a single byte, of a data block, the entire data block stored in a memory block, has to be read out from the memory block. This is because a larger memory may typically only be accessed on a memory block basis. If, for example, a data block has a net data block size of 16 bytes or 128 bits comprising sub-words or data words, each including 4 bytes, the entire 16 bytes will have to be read for accessing an individual byte. This produces a time lack of at least three or four clocks for reading the three data words not including this individual byte.

The way of compensating the slow access problem in the case of a greater memory block is installing and using a cache memory between the main memory and the processor. The cache is a smaller, faster memory, which may store copies of the data from the most frequently-used main memory locations. When the CPU needs to read from, or write to, a memory area in the main memory, it first checks whether a copy of that memory area is already in the cache. If so, the CPU may immediately read from or write to the cache, which is much faster than reading from or writing to the main memory.

In case of a cache miss, i.e. in case data of a desired memory block does not already reside in the cache memory, data of the memory block comprising a data block and an associated error detection or correction value is read from the main memory into the cache. Error detection and/or correction may be performed based on the data block and the associated error detection/correction value.

Once in the cache, the CPU may process or manipulate the desired data before the resulting data block is written back from the cache to the main memory. During or before the memory-write-operation, a new error detection or error correction code is determined for the resulting data block. After that, the resulting data is written back to the main memory.

Due to a fault inducing attack, a problem may arise in that the resulting data is not written back to the original memory block's address but to a wrong memory address of the main memory. In this case the original data block is still available at the original memory block's address and, hence, the original data block at the original memory address may be read at a later time without realizing that this original data should have actually been already modified. This is because the associated error detection/correction value (e.g. a check sum) is also still correct.

A flow-chart of a method 10 according to an embodiment of the present invention, which may solve the above-mentioned problem, is schematically shown in FIG. 1.

The method 10 serves for writing data to be stored to a predetermined memory area, the data to be stored comprising a data block and an associated error detection or correction value. As has been explained above, the predetermined memory area may be a memory block located in a main memory, such as, for example, a random access memory (RAM).

In a first step 12, data stored in the predetermined memory area is read from the predetermined memory area e.g. via a memory bus. The stored data thereby comprises a stored data block and an error detection or correction value associated to the stored data block. This error detection/correction value may, e.g., be a parity value, a check-sum or another value comprising redundancy information from known error-correction codes on which basis a limited amount of errors in the data block may be detected and/or corrected.

After reading the stored data (step 12), at least one of the stored data block or the associated stored error detection value is manipulated in the predetermined memory area in a step 14. It will be described below how the predetermined memory area may be manipulated. In other words, the content of the memory block, from where the original data block and the associated error detection/correction value where read in step 12, is altered.

Further, after the manipulation in step 14, the data to be stored is written to the predetermined memory area in step 16. Thereby, the data to be stored results from the original data block read from the predetermined memory area, wherein at least single data words of the original data block may have been processed and altered in the meantime, e.g. by a CPU.

According to some embodiments, manipulating the predetermined memory area (step 14) is performed such that the manipulation may not be corrected by applying an error correction scheme on the manipulated data in the predetermined memory area. In other words, the content of the original memory block is changed to such an extent, that artificially introduced errors by that change may not be corrected by an employed error correction scheme. This ensures that a corrupted write-operation (step 16) may, by all means, be detected at a later time when accessing the original memory block or data stored therein.

If, due to a corrupted write-operation, the data to be stored, i.e. the data resulting from the original data block, is not written to the predetermined memory area after the predetermined memory has been manipulated (step 14), the manipulated data stored therein will not be overwritten. Since the content of the original, predetermined memory area has been changed such that the data block and the error detection/correction value stored therein do not fit each other with respect to an underlying error correction scheme, the systematic (and considerable) manipulation of the original, predetermined memory area may be detected, but not corrected when reading the manipulated data from the same predetermined memory area at a later stage. The manipulation in step 14 has to be that considerable that the case of a single-bit error (or the like) can be excluded. This is why enough errors have to be introduced by the manipulation such that the error code may not be able to correct them any more.

In this way a malicious side-channel attack leading to a wrong write or write-back operation may be reliably detected and adequate countermeasures may be initiated.

The manipulation 14 of the predetermined memory area may be done in various ways. For example, the data stored therein may be manipulated randomly or it may be manipulated according to a specific manipulation scheme, which may be adapted to lead to a definite failure of the underlying error correction mechanism. In other words, the manipulation 14 should introduce an error vector to the data stored in the memory block, which may not be corrected by the error-correcting scheme later on. An efficient way of introducing such an error vector may be deleting or erasing the stored data block and/or the associated stored error detection value from the predetermined memory area, i.e. the memory block.

As has been mentioned above, the predetermined memory area may be an error-code protected memory area, for example, a RAM, which is coupled to a cache memory. In this case, reading (step 12) comprises reading the stored data from the error code protected memory area into the cache memory. Similarly, writing (step 16) comprises writing the data to be stored from the cache memory into the error code protected memory area.

In order to detect a previously-incorrect writing (step 16) or write-operation, e.g. due to an attack scenario, reading (step 12) comprises performing an error identification and/or error correction of the read data block based on the read error detection/correction value, wherein both are read from the predetermined memory block. For this purpose, various error-correction algorithms may be applied. In case an identified error of the data block read from the predefined memory area cannot be corrected by an appropriate error correction mechanism, reading (step 12) is followed by signalizing a previous erroneous writing (step 16). In this case, a potential cryptographic attack may be signaled and appropriate countermeasures, such as, e.g. a system shutdown, may be initiated. This shall be illustrated in more detail referring now to FIG. 2.

Figure 2:
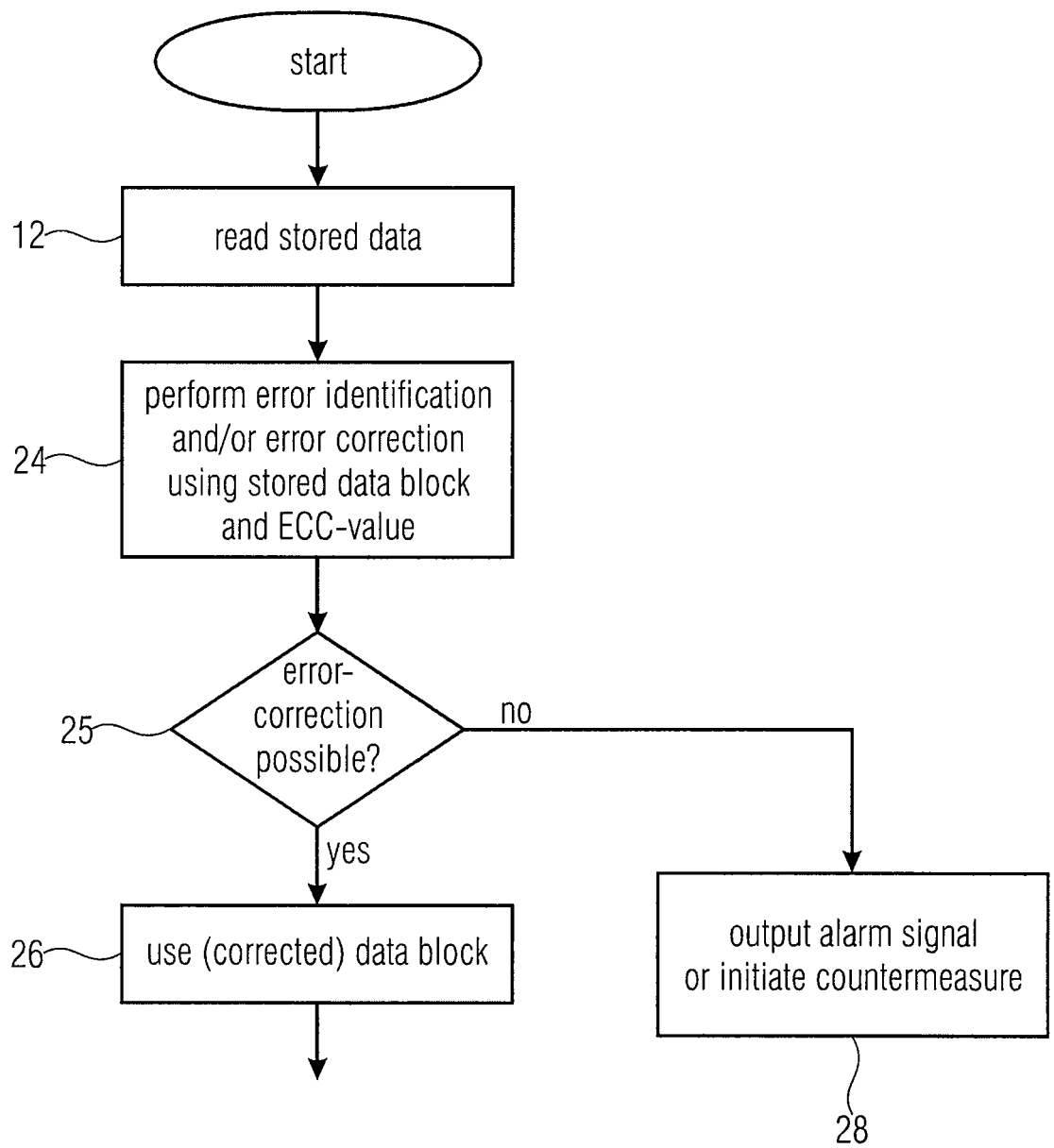
FIG. 2 shows a flow chart for detecting an attack based on an embodiment of the present invention.

FIG. 2 exemplarily shows a method 20 comprising further steps after reading (step 12) the stored data from the predetermined memory area. After the data is read from, e.g., a main memory to a cache memory, an error identification and/or correction (step 24) is performed using the read data. Step 24 may thereby be directly performed within the main memory itself in which the data is stored. Likewise, step 24 may also be performed outside the main memory, e.g., in the cache memory or an attached CPU using adequate program instructions.

In a further step 25, it is determined whether the data block and the associated error detection/correction value fetched from the predetermined memory area are error-free or allow an error correction. If this is the case, the error-free or error-corrected data block may be used for further processing within the cache memory or by the CPU (step 26). After the data block has been processed or altered, the altered data block may again be error-protected and written back to the original, predetermined memory area. It is to be noted, that, according to embodiments of the present invention, the content of the predetermined memory block has been modified (step 14) between the read-operation (step 12) and the write-operation (step 16).

However, in case step 25 indicates that an error correction of the data read from the predetermined memory area is not possible based on an underlying error-correction scheme, an alarm signal may be output or an attack-countermeasure may be initiated (step 28).

Figure 3:
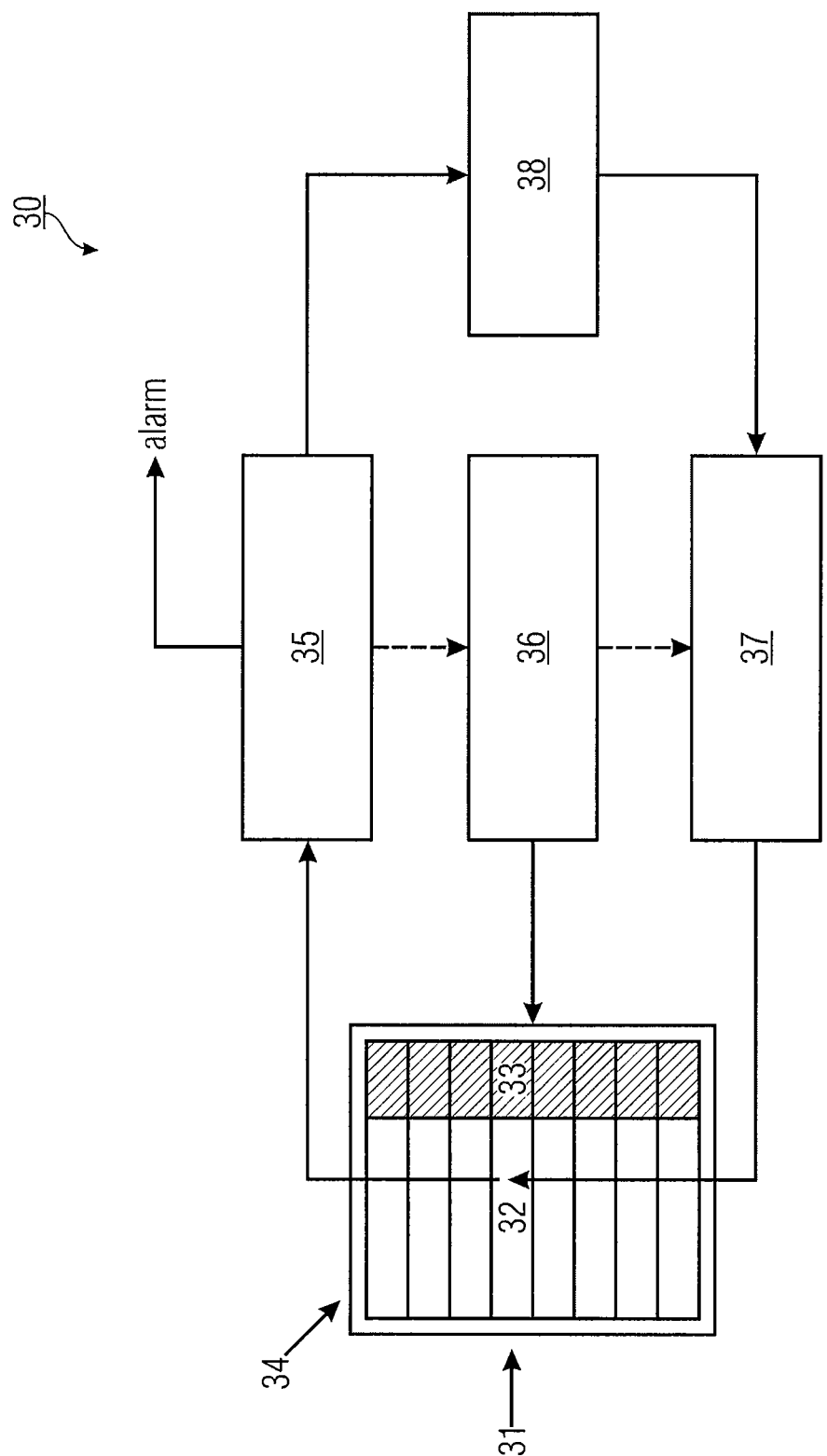
FIG. 3 shows a schematic block diagram of an apparatus for writing data to be stored to a predetermined memory area according to an embodiment of the present invention.

Turning now to FIG. 3, a schematic block diagram of an apparatus 30, according to an embodiment of the present invention, for writing data to be stored to a predetermined memory area 31 is shown.

The predetermined memory area 31, which may be an addressable memory block or unit of a main memory 34, such as, e.g., a RAM, has stored therein a data block 32 and an associated error detection value 33.

The apparatus 30 comprises a data reader 35 configured to read the stored data 32, 33 from the predetermined memory area 31. Further, the apparatus 30 comprises a memory manipulator 36 configured to, after reading the stored data 32, 33, manipulate at least one of the stored data block 32 or the associated stored error detection value 33 in the predetermined memory area 31. In addition, a data writer 37 is provided to write, after manipulating, the data to be stored to the predetermined memory area 31.

According to some embodiments, the apparatus 30 may further comprise a data manipulator 38, which is configured to manipulate, after reading and before writing, at least a part of the read data block 32 in order to obtain the data block to be stored. The data manipulator may, for example, be a processing unit (CPU) for processing and altering data stored in the main memory 34 according to program instructions.

As mentioned above, the data reader 35 may be configured to perform an error identification and/or correction of the read data 32, 33 after feeding the read data into an appropriate error detection mechanism. The data reader 35 may also be configured to signal a previous erroneous writing operation by the data writer 37 in case an identified error of the data block 32 read from the predefined memory area 31 cannot be corrected by the error connection mechanism. In this case, an alarm is signaled and/or an appropriate attack-countermeasure may be initiated.

The data reader 35, the memory manipulator 36 and the data writer 37 may be tuned or adjusted to each other, which is indicated by the dashed arrows in FIG. 3. This means that the following schedule is performed:

1. Reading from the predefined memory area 31;
2. manipulating, e.g. erasing, the predetermined memory area 31; and
3. writing data to be stored to the predetermined memory area 31 or in case of an attack, to some other place.

The individual blocks of the apparatus 30 may be implemented as hardware. They may be distributed among different components of a computing or memory system. In other words, although not explicitly shown, the various blocks may be distributed between a main memory 34 and a cache memory and/or a CPU. At least the memory manipulator 36 may be implemented in the main memory 35 itself. In other words, the manipulation or alteration of the predetermined memory area is executed by the main memory 34 itself, e.g. using an embedded controller, during or after the read-operation 12. For this reason, an appropriate memory manipulation or eraser circuit may be implemented into the main memory 34.

In addition, the data reader 35 and/or the data writer 37 may be integrated into the main memory 34 as part of an I/O (input/output) interface. According to other embodiments, the reader 35 and the writer 37 may be part of a memory or cache controller.

The data manipulator 38 may be realized by a CPU or a micro controller for processing and handling the data stored in the main memory 34, as mentioned above.

To summarize, embodiments provide a concept for allowing a high protection of memory-write-operations for error code protected data. This may be achieved by implementing a data-changing read-operation prior to a write-operation without requiring further sophisticated measures. Prior to each write-operation, data is read from a predefined memory area and an error-code examination is performed. Just after the read-operation, the read data is modified or even deleted. This modification-operation may be performed by the memory itself during or after the actual read-operation. Consequently, the read data (that is to be processed by e.g. a CPU) cannot be read from the predefined memory area for a second time without having a successful write-operation take place in the meantime, i.e. between the two read-operations accessing the same memory area. A write-operation is considered to be successful, in case the previously read and altered data is written back correctly to the predefined memory area. However, in case of a wrong write-operation, i.e. a write-operation writing the read and altered data back to a wrong memory address, no valid error-code word exists anymore for the originally-read data at the predefined memory area (since the stored data has been modified/erased). Hence, it may be ensured that a corrupt write-operation might be detected during a later access of the intentionally damaged data stored in the predetermined memory area.

Embodiments are particularly suitable for systems performing data access via a cache memory. This makes sense especially for error-protected main memories, since an error-word protected memory unit will be substantially greater than the smallest writable data unit (for example, one byte). In this case, a memory area or unit, which shall be overwritten, has to be transferred to the cache (by the read-operation 12). Since some embodiments invalidate the data read from the main memory area, it has to be ensured that the cached data is written back to the main memory when it is to be displaced from the cache irrespective as to whether it has been really overwritten or not. For RAM main memories, this is no significant disadvantage, since RAM, which is accessed by reading, is normally also, within a rather short time period, accessed by writing (on condition of a reasonable cache hit rate). Hence, embodiments may be highly efficient in a cache system and may provide an outstanding protection against erroneous memory writing, e.g. due to side-channel attacks.

In principle, the present invention may, of course, be applied to any memory types allowing reading and writing access.

Embodiments may be employed with particular advantage to memory systems comprising a main memory such as, for example, a flash-based memory or a RAM-type memory in conjunction with a faster cache memory.

Depending on the circumstances, the inventive method for writing data may be implemented in either hardware or software. The implementation may be on a digital storage medium, in particular on a disc, CD or DVD having control signals which may be read out electronically which can cooperate with a programmable computer system such that the inventive method for writing data will be executed. Generally, the invention thus also is in a computer program product having a program code stored on a machine-readable carrier for performing one of the inventive methods when the computer program product runs on a computer. Put differently, the invention thus may also be realized as a computer program having a program code for performing one of the methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for writing data to be stored to a predetermined memory area, the apparatus comprising:
   a data reader configured to read stored data from the predetermined memory area, the stored data comprising a stored data block and an associated stored error detection value;
   a memory manipulator configured to, after reading the stored data, manipulate at least one of the stored data block and the associated stored error detection value in the predetermined memory area such that the content of the predetermined memory area from where the stored data were read is altered; and
   a data writer configured to write, after manipulating the at least one of the stored data block and the associated stored error detection value in the predetermined memory area, the data to be stored to the predetermined memory area,
   wherein the memory manipulator is configured to artificially induce an error by manipulating the stored data in the predetermined memory area such that the manipulation may not be corrected by applying an error correction scheme used to generate the stored error detection value and such that the manipulation may be detected but not corrected if the data to be stored to the predetermined memory area are not written to the predetermined area after the predetermined memory area has been manipulated, and
   wherein the predetermined memory area is an error code protected memory area coupled to a cache memory, wherein the data reader is configured to read the stored data from the error code protected memory area into the cache memory, and wherein the data writer is configured to write the data to be stored from the cache memory into the error code protected memory area.

2. The apparatus according to claim 1, wherein the memory manipulator is configured to manipulate the stored data in the predetermined memory area such that the manipulation may not be corrected by applying an error correction scheme on the manipulated data in the predetermined memory area.

3. The apparatus according to claim 1, wherein the memory manipulator is configured to erase the stored data block and/or the associated stored error detection value from the predetermined memory area.

4. The apparatus according to claim 1, wherein the data reader is configured to perform an error identification and/or error correction of the stored data block based on the stored error detection value.

5. The apparatus according to claim 4, wherein the data writer is configured to apply an error protection mechanism to the data block to be stored yielding the error detection value.

6. The apparatus according to claim 4, wherein the data reader is configured to signal a previous erroneous writing in case an identified error of the stored data block cannot be corrected by an appropriate error correction mechanism.

7. The apparatus according to claim 1, wherein the apparatus further comprises a data manipulator configured to manipulate, after reading and before writing, at least a part of the read data block in order to obtain the data block to be stored.

8. An apparatus for writing data to be stored to a predetermined memory area, the apparatus comprising:
   a data reader configured to read stored data from the predetermined memory area, the stored data comprising a stored data block and an associated stored error detection value;
   a memory manipulator configured to, after reading the stored data, erase the stored data block and/or the associated stored error detection value from the predetermined memory area such that the content of the predetermined memory area from where the stored data were read is altered; and
   a data writer configured to, after the erasure, write the data to be stored to the predetermined memory area,
   wherein the memory manipulator is configured to artificially induce an error by manipulating the stored data in the predetermined memory area such that the manipulation may not be corrected by applying an error correction scheme used to generate the stored error detection value and such that the manipulation may be detected but not corrected if the data to be stored to the predetermined memory area are not written to the predetermined area after the predetermined memory area has been manipulated, and
   wherein the predetermined memory area is an error code protected memory area coupled to a cache memory, wherein the data reader is configured to read the stored data from the error code protected memory area into the cache memory, and wherein the data writer is configured to write the data to be stored from the cache memory into the error code protected memory area.

9. A method for writing data to be stored to a predetermined memory area, the method comprising:
   reading stored data from the predetermined memory area, the stored data comprising a stored data block and an associated stored error detection value;
   manipulating, after reading the stored data, at least one of the stored data block and the associated stored error detection value in the predetermined memory area such that the content of the predetermined memory area from where the stored data were read is altered; and
   writing, after manipulating the at least one of the stored data block and the associated stored error detection value in the predetermined memory area, the data to be stored to the predetermined memory area,
   wherein manipulating comprises artificially inducing an error by manipulating the stored data in the predetermined memory area such that the manipulation may not be corrected by applying an error correction scheme used to generate the stored error detection value and such that the manipulation may be detected but not corrected if the data to be stored to the predetermined memory area are not written to the predetermined area after the predetermined memory area has been manipulated, and
   wherein the predetermined memory area is an error code protected memory area coupled to a cache memory, wherein the reading comprises reading the stored data from the error code protected memory area into the cache memory, and wherein the writing comprises writing the data to be stored from the cache memory into the error code protected memory area.

10. The method according to claim 9, wherein the manipulating the predetermined memory area is performed such that the manipulation may not be corrected by applying an error correction scheme on the manipulated data in the predetermined memory area.

11. The method according to claim 9, wherein the manipulating comprises erasing the stored data block and/or the associated stored error detection value from the predetermined memory area.

12. The method according to claim 9, wherein the reading comprises performing an error identification and/or error correction of the stored data block based on the stored error detection value.

13. The method according to claim 12, wherein the writing comprises applying an error protection mechanism to the data block to be stored yielding the error detection value.

14. The method according to claim 12, wherein the reading is followed by signaling a previous erroneous writing in case an identified error of the stored data block cannot be corrected by an appropriate error correction mechanism.

15. The method according to claim 9, wherein the method further comprises manipulating, after reading and before writing, at least a part of the read data block in order to obtain the data block to be stored.

16. A computer-readable memory storing a computer program comprising a program code for performing a method for writing data to be stored to a predetermined memory area, comprising: p1 reading stored data from the predetermined memory area, the stored data comprising a stored data block and an associated stored error detection value;

manipulating, after reading the stored data, at least one of the stored data block and the associated stored error detection value in the predetermined memory area such that the content of the predetermined memory area from where the stored data were read is altered; and writing, after manipulating the at least one of the stored data block and the associated stored error detection value in the predetermined memory area, the data to be stored to the predetermined memory area, wherein manipulating comprises artificially inducing an error by manipulating the stored data in the predetermined memory area such that the manipulation may not be corrected by applying an error correction scheme used to generate the stored error detection value and such that the manipulation may be detected but not corrected if the data to be stored to the predetermined memory area are not written to the predetermined area after the predetermined memory area has been manipulated, and wherein the predetermined memory area is an error code protected memory area coupled to a cache memory, wherein the reading comprises reading the stored data from the error code protected memory area into the cache memory, and wherein the writing comprises writing the data to be stored from the cache memory into the error code protected memory area.

* * * * *